US012694468B2

(12) United States Patent
Li et al.

(10) Patent No.: US 12,694,468 B2
(45) Date of Patent: Jul. 28, 2026

(54) RANGE AWARE SPATIAL UPSCALING

(71) Applicant: QUALCOMM Incorporated, San Diego, CA (US)

(72) Inventors: Siqi Li, Shenzhen (CN); Yunzhen Li, Shenzhen (CN); Qi Jin, Shanghai (CN); Yanshan Wen, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 18/525,625

(22) Filed: Nov. 30, 2023

(65) Prior Publication Data

US 2024/0177267 A1 May 30, 2024

Related U.S. Application Data

(63) Continuation of application No. PCT/CN2022/135426, filed on Nov. 30, 2022.

(51) Int. Cl.
*G06T 3/4007* (2024.01)
*G06T 5/50* (2006.01)
*G06T 5/73* (2024.01)

(52) U.S. Cl.
CPC .............. *G06T 3/4007* (2013.01); *G06T 5/50* (2013.01); *G06T 5/73* (2024.01); *G06T 2207/20016* (2013.01); *G06T 2207/20224* (2013.01)

(58) Field of Classification Search
CPC .......... G06T 3/4007; G06T 5/50; G06T 5/73; G06T 2207/20016; G06T 2207/20224
See application file for complete search history.

(56) References Cited

U.S. PATENT DOCUMENTS

| | | | |
|---|---|---|---|
| 7,551,805 B2 * | 6/2009 | Namie | ................... G06T 3/4007 |
| | | | 382/300 |
| 9,042,658 B2 * | 5/2015 | Nakamura | ............. H04N 1/401 |
| | | | 382/300 |

(Continued)

FOREIGN PATENT DOCUMENTS

| | | |
|---|---|---|
| CN | 111899175 A | 11/2020 |
| CN | 115272067 A | 11/2022 |
| CN | 115280368 A | 11/2022 |

OTHER PUBLICATIONS

Park CH, Chang J, Kang MG. Kernel-based image upscaling method with shooting artifact reduction. InImage Processing: Algorithms and Systems XI Feb. 19, 2013 (vol. 8655, pp. 273-281). SPIE (Year: 2013).*

(Continued)

*Primary Examiner* — Xuemei G Chen
(74) *Attorney, Agent, or Firm* — ArentFox Schiff LLP

(57) ABSTRACT

Aspects are provided for preserving the edge sharpness and enhancing details while upscaling a rendered image. Some aspects specifically relate to upscaling images using a spatial difference between a pixel to be interpolated and respective neighboring pixels, and an intensity difference between respective neighboring pixels and a mean intensity of a subset of the neighboring pixels. Considering both the spatial and intensity difference during upscaling prevents small details of the input image from being smoothed, since a larger weight may be assigned to pixels with a closer intensity value and that are closer in distance to the pixel to be interpolated than in techniques such as bilinear interpolation where only spatial difference may be considered. The result is an upscaled image that preserves sharp edges and small detail for a more accurate upscaled image in a higher resolution than compared to related upscaling methods that only consider using spatial difference.

30 Claims, 8 Drawing Sheets

(56)    References Cited

U.S. PATENT DOCUMENTS

| | | | | |
|---|---|---|---|---|
| 10,970,817 B2 * | 4/2021 | Taoka | .................. | G06T 3/4061 |
| 11,431,955 B1 * | 8/2022 | Ning | ......................... | G06T 5/50 |
| 2013/0342698 A1 | 12/2013 | Thompson | | |
| 2015/0146928 A1 * | 5/2015 | Kim | ......................... | G06T 7/55 |
| | | | | 382/103 |
| 2016/0320476 A1 * | 11/2016 | Johnson | .................... | G06T 7/20 |
| 2017/0053380 A1 * | 2/2017 | McNally | .................. | G06T 7/60 |
| 2018/0040104 A1 | 2/2018 | Lukac | | |
| 2021/0056287 A1 * | 2/2021 | Schaumburg | ........ | G06V 20/695 |
| 2022/0114697 A1 * | 4/2022 | Monden | ................ | H04N 9/646 |
| 2022/0284543 A1 * | 9/2022 | Jo | .................... | G06V 30/18095 |
| 2023/0035482 A1 * | 2/2023 | Glotzbach | ................ | G06T 5/70 |
| 2023/0214959 A1 * | 7/2023 | Mitani | ..................... | G06T 5/50 |

OTHER PUBLICATIONS

International Search Report and Written Opinion—PCT/CN2022/135426—ISA/EPO—Aug. 1, 2023.

\* cited by examiner

100

400b

400a

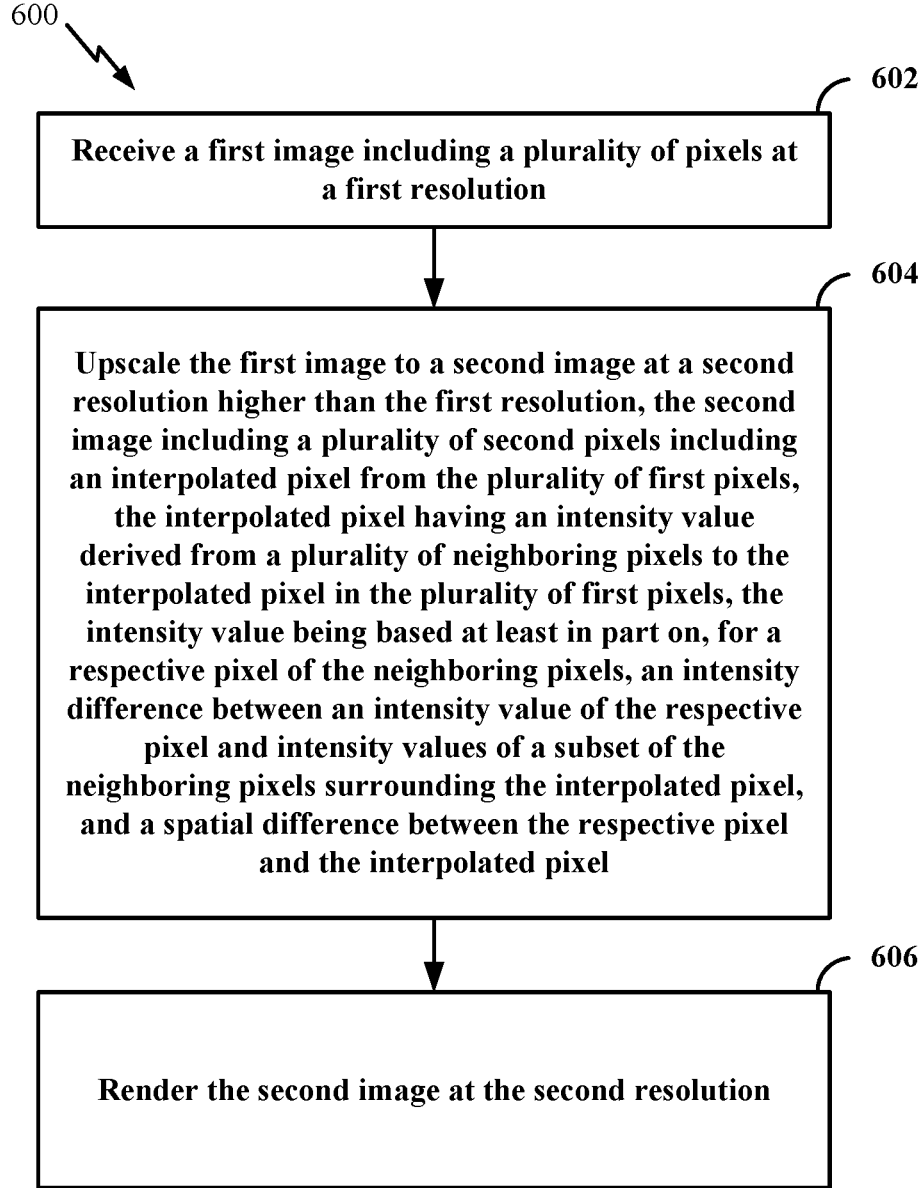

600

602

Receive a first image including a plurality of pixels at a first resolution

604

Upscale the first image to a second image at a second resolution higher than the first resolution, the second image including a plurality of second pixels including an interpolated pixel from the plurality of first pixels, the interpolated pixel having an intensity value derived from a plurality of neighboring pixels to the interpolated pixel in the plurality of first pixels, the intensity value being based at least in part on, for a respective pixel of the neighboring pixels, an intensity difference between an intensity value of the respective pixel and intensity values of a subset of the neighboring pixels surrounding the interpolated pixel, and a spatial difference between the respective pixel and the interpolated pixel

606

Render the second image at the second resolution

FIG. 6

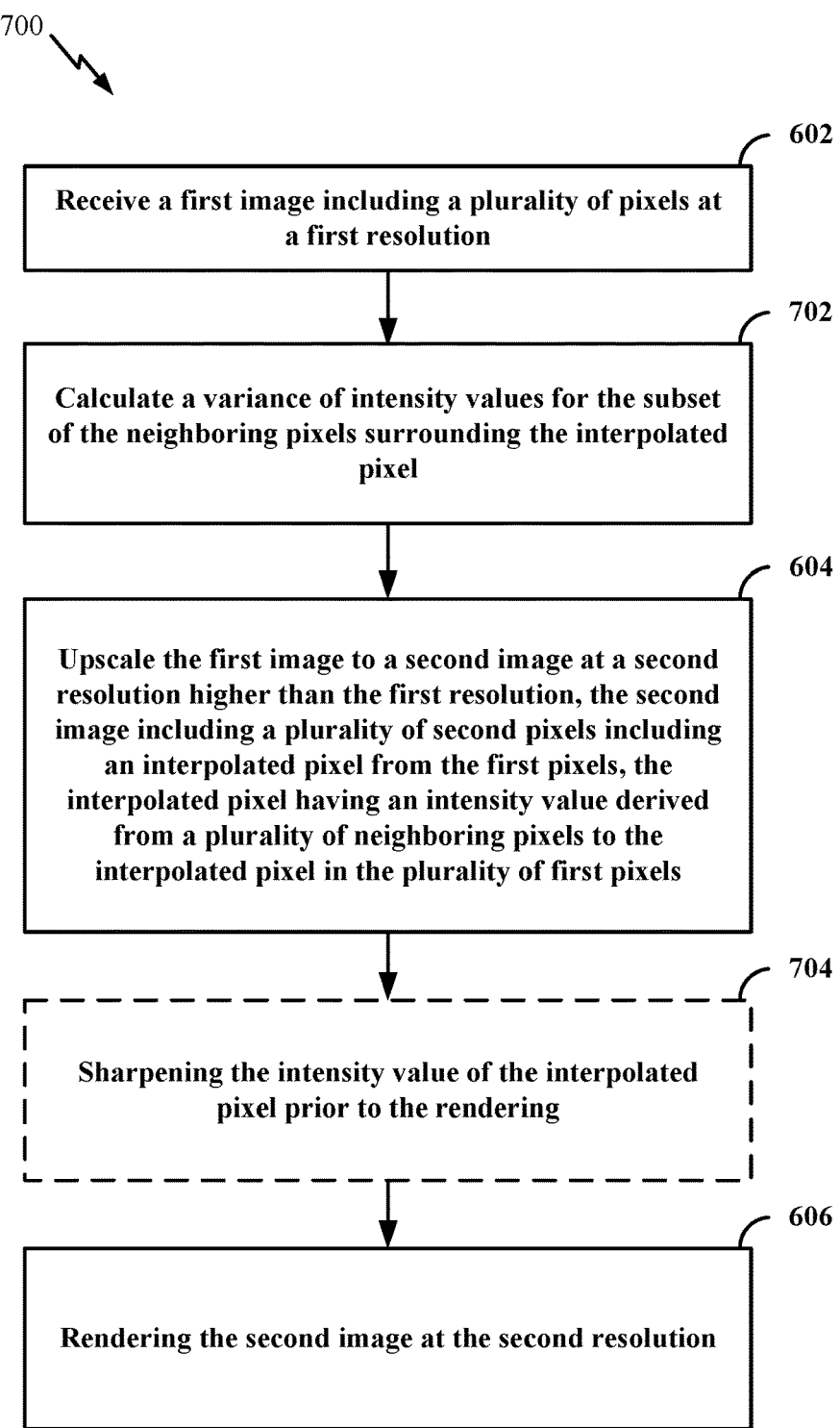

700

602

Receive a first image including a plurality of pixels at a first resolution

702

Calculate a variance of intensity values for the subset of the neighboring pixels surrounding the interpolated pixel

604

Upscale the first image to a second image at a second resolution higher than the first resolution, the second image including a plurality of second pixels including an interpolated pixel from the first pixels, the interpolated pixel having an intensity value derived from a plurality of neighboring pixels to the interpolated pixel in the plurality of first pixels

704

Sharpening the intensity value of the interpolated pixel prior to the rendering

606

Rendering the second image at the second resolution

FIG. 7

RANGE AWARE SPATIAL UPSCALING

CROSS REFERENCE TO RELATED APPLICATION

This patent application is a bypass continuation of International Patent Application No. PCT/CN2022/135426, entitled "RANGE AWARE SPATIAL UPSCALING," filed on Nov. 30, 2022. The International Patent Application is incorporated by reference in its entirety.

TECHNICAL FIELD

The present disclosure relates generally to processing systems and, more particularly, to one or more techniques for graphics processing.

INTRODUCTION

Computing devices often utilize a graphics processing unit (GPU) or central processing unit (CPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A CPU may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the increasing complexity of rendered content and the physical constraints of GPU memory, there has developed an increased need for improved computer or graphics processing.

SUMMARY

The following presents a simplified summary of one or more aspects in order to provide a basic understanding of such aspects. This summary is not an extensive overview of all contemplated aspects, and is intended to neither identify key elements or critical elements of all aspects nor delineate the scope of any or all aspects. Its sole purpose is to present some concepts of one or more aspects in a simplified form as a prelude to the more detailed description that is presented later.

In an aspect, the subject matter described in this disclosure can be implemented in a method for graphics processing. The method includes receiving a first image including a plurality of first pixels at a first resolution; upscaling the first image to a second image at a second resolution higher than the first resolution, the second image including a plurality of second pixels including an interpolated pixel from the plurality of first pixels, the interpolated pixel having an intensity value derived from a plurality of neighboring pixels to the interpolated pixel in the plurality of first pixels, the intensity value being based at least in part on, for a respective pixel of the neighboring pixels, an intensity difference between an intensity value of the respective pixel and an average intensity value of a subset of the neighboring pixels surrounding the interpolated pixel, and a spatial difference between the respective pixel and the interpolated pixel; and rendering the second image at the second resolution.

In another aspect, the subject matter described in the disclosure can be implemented in an apparatus for graphics processing. The apparatus includes a memory and at least one processor coupled to the memory. The processor is configured to receive a first image including a plurality of first pixels at a first resolution. The processor is also configured to upscale the first image to a second image at a second resolution higher than the first resolution, where the second image includes a plurality of second pixels including an interpolated pixel from the plurality of first pixels, where the interpolated pixel has an intensity value derived from a plurality of neighboring pixels to the interpolated pixel in the plurality of first pixels, where the intensity value is based at least in part on, for a respective pixel of the neighboring pixels, an intensity difference between an intensity value of the respective pixel and an average intensity value of a subset of the neighboring pixels surrounding the interpolated pixel, and a spatial difference between the respective pixel and the interpolated pixel. The processor is further yet configured to render the second image at the second resolution.

Another further aspect of the subject matter described in the disclosure can be implemented in a non-transitory computer-readable medium storing computer-executable code including stored instructions of communications, executable by a processor is configured to receive a first image including a plurality of first pixels at a first resolution. The processor is also configured to upscale the first image to a second image at a second resolution higher than the first resolution, where the second image includes a plurality of second pixels including an interpolated pixel from the plurality of first pixels, where the interpolated pixel has an intensity value derived from a plurality of neighboring pixels to the interpolated pixel in the plurality of first pixels, where the intensity value is based at least in part on, for a respective pixel of the neighboring pixels, an intensity difference between an intensity value of the respective pixel and an average intensity value of a subset of the neighboring pixels surrounding the interpolated pixel, and a spatial difference between the respective pixel and the interpolated pixel. The processor is further yet configured to render the second image at the second resolution.

Yet another further aspect of the subject matter described in the disclosure can be implemented in an apparatus. The apparatus comprising means for receiving a first image including a plurality of first pixels at a first resolution. The apparatus further comprises means for upscaling the first image to a second image at a second resolution higher than the first resolution, where the second image includes a plurality of second pixels including an interpolated pixel from the plurality of first pixels, where the interpolated pixel has an intensity value derived from a plurality of neighboring pixels to the interpolated pixel in the plurality of first pixels, where the intensity value is based at least in part on, for a respective pixel of the neighboring pixels, an intensity difference between an intensity value of the respective pixel and an average intensity value of a subset of the neighboring pixels surrounding the interpolated pixel, and a spatial difference between the respective pixel and the interpolated pixel. The apparatus further yet comprises means for rendering the second image at the second resolution.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 6 is a flowchart of a method of graphics processing.

FIG. 7 is a flowchart of a method of graphics processing.

Like reference numbers and designations in the various drawings indicate like elements.

Figure 1A:
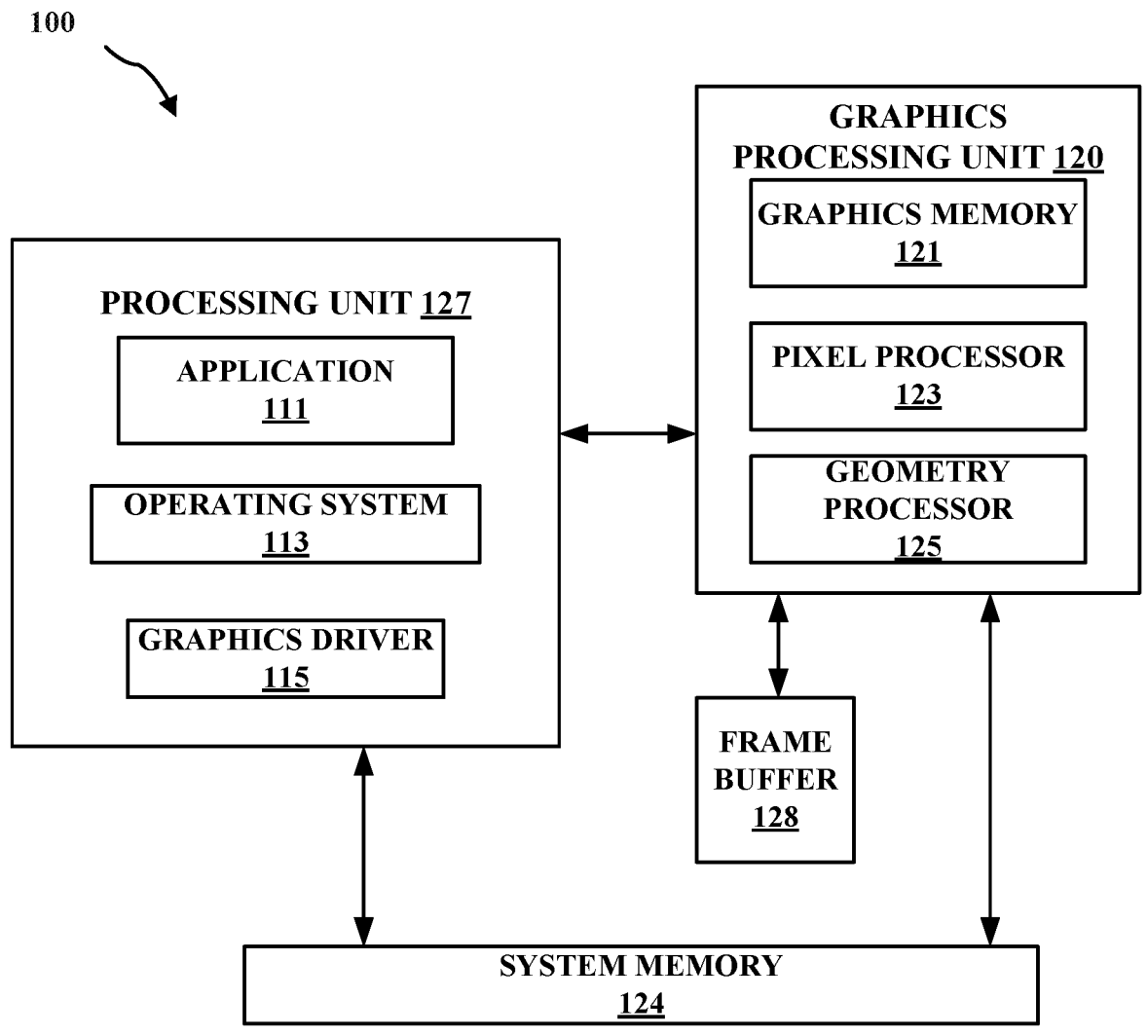
FIG. 1A is a block diagram that illustrates an example of a content upscaling system in accordance with one or more techniques of this disclosure.

An Appendix, incorporated herein in its entirety, is attached hereto and is considered part of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, the concepts and related aspects described in the present disclosure may be implemented in the absence of some or all of such specific details. In some instances, well-known structures, components, and the like are shown in block diagram form in order to avoid obscuring such concepts.

Various aspects of the present disclosure relate generally to graphics processing and more particularly to range aware spatial upscaling. Some aspects of the present disclosure more specifically relate to upscaling images using both a spatial difference between a pixel to be interpolated and respective neighboring pixels, and an intensity difference between respective neighboring pixels and a mean intensity of a subset of the neighboring pixels. In some examples, during rendering of upscaled images, two core properties of an input image may be maintained, including edge preserving and small detail preserving, when determining an intensity of the pixel to be interpolated in an upscaled image. Considering both the spatial and intensity difference during upscaling prevents small details of the input image from being smoothed, since a larger weight may be assigned to pixels with a closer intensity value and that are closer in distance to the pixel to be interpolated than in techniques such as bilinear interpolation where only spatial difference may be considered. The result is an upscaled image that preserves sharp edges and small detail for a more accurate upscaled image in a higher resolution than compared to related upscaling methods that only consider using spatial difference.

In addition, aspects of the present disclosure may be content aware for selectively applying a rendering technique to potential edge pixels. This content aware optimization may reduce texture sampling instructions based on a determination that pixels of the neighboring pixels of a pixel to be interpolated are similar in intensity. When the intensity of the neighboring pixels are similar, as indicated by their variance being less than a threshold, it is likely that the unknown pixel is not a potential edge pixel, and therefore bilinear interpolation which takes an average of the intensity of the neighboring pixels may be used to derive the output pixel. In contrast, when the neighboring pixel intensities to an interpolated pixel are dissimilar, as indicated by their variance being greater than or equal to a threshold, interpolation based on spatial and intensity difference may be utilized.

Thus, aspects of the present disclosure can preserve edge sharpness and enhance details when upscaling a rendered image to a higher resolution. Aspects of the present disclosure reduce processing overhead as minimal texture sampling and fewer operations are used as compared with other related upscaling methods by using a range aware spatial upscaling technique based on a determination that the pixels are potential edge pixels. Selectively applying the range aware spatial upscaling techniques to potential edge pixels allow an apparatus to conserve rendering or processing resources when upscaling images. Aspects of the present disclosure are efficient on mobile platforms for upscaling a rendered image because minimal texture sampling and operations are used.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

When scaling rendered images, an intensity of a pixel from an input image may be interpolated to a scaled image. Generally, the intensity of the unknown pixel is calculated by taking an average of intensity values from neighboring pixels of the unknown pixel. However, simply taking an average intensity from neighboring pixels may blur a sharp edge or result in a loss of detail in the unknown pixel. This problem is exacerbated when the immediate pixels neighboring the unknown pixel have a large difference in intensity from the unknown pixel with a similar spatial distance from the unknown pixel.

To achieve high quality visual images in computer games, many computer games render a two-dimensional (2D) user interface (UI) at a device resolution and render three-dimensional (3D) scenes at a lower resolution to save power consumption. At the beginning of the UI draw, the 3D scene image is bilinearly upscaled to the 2D UI resolution. Specifically, bilinear scaling considers the closest two by two neighborhood (e.g., a window of four pixels) of known pixel intensity values surrounding the computed location of the unknown pixel and then calculates a weighted average of the two by two neighborhood of known pixel intensity values. This method is fast, but, as mentioned above, may result in blurred edges and a loss of fine detail such as isolated pixels in the upscaled image due to the intensity value of each pixel in the neighborhood of known pixel being equally weighted.

Thus, while an image may be quickly scaled to a higher resolution by using bilinear scaling which considers a spatial distance (e.g., identifying the closest four pixels) of known pixel values that surround a computed location of the unknown pixel and determines a weighted average of these four pixels, this technique may blur edges or other details. Instead, it may be helpful to scale a rendered image to a higher resolution by considering both spatial distance for preserving small details and intensity distance between close pixels for preserving edges of the unknown pixel. This leads to upscaling more accurate rendered images with higher resolutions as compared with related upscaling techniques. For example, this disclosure describes techniques for graphics processing in any device that utilized graphics processing. Other example benefits are also described throughout this disclosure.

FIG. 1A is a block diagram that illustrates an example image upscaling system 100 configured to implement one or more techniques of this disclosure. As generally shown, the image upscaling system 100 includes a processing unit 127, a GPU 120, and a system memory 124 configured to render a 3D scene according to an exemplary aspects. Processing unit 127 may execute software application 111, operating system (OS) 113, and graphics driver 115. Moreover, system memory 124 may include indirect buffers that store the command streams for rendering primitives as well as secondary commands that are to be executed by GPU 120. GPU 120 may include graphics memory (GMEM) 121 that may be "on-chip" with GPU 120 that is coupled to a pixel processor 123 and a geometry processor 125. As described in more detailed with respect to FIG. 1B, the components of the image upscaling system 100 may be part of a device, including, but are not limited to, video devices, media players, set-top boxes, wireless handsets such as mobile telephones and so-called smartphones, personal digital assistants (PDAs), desktop computers, laptop computers, gaming consoles, video conferencing units, tablet computing devices, and the like.

Processing unit 127 may be the central processing unit (CPU). GPU 120 may be a processing unit configured to perform graphics related functions such as generate and output graphics data for presentation on a display, as well as perform non-graphics related functions that exploit the massive processing parallelism provided by GPU 120. Because GPU 120 may provide general-purpose processing capabilities in addition to graphics processing capabilities, GPU 120 may be referred to as a general-purpose GPU (GP-GPU). Examples of processing unit 127 and GPU 120 include, but are not limited to, a digital signal processor (DSP), a general-purpose microprocessor, application specific integrated circuit (ASIC), field programmable logic array (FPGA), or other equivalent integrated or discrete logic circuitry. In some examples, GPU 120 may be a microprocessor designed for specific usage such as providing massive parallel processing for processing graphics, as well as for executing non-graphics related applications. Furthermore, although processing unit 127 and GPU 120 are illustrated as separate components, aspects of this disclosure are not so limited and can be, for example, residing in a common integrated circuit (IC).

Software application 111 that executes on processing unit 127 may include one or more graphics rendering instructions that instruct processing unit 127 to cause the rendering of graphics data to a display (not shown in FIG. 1A). In some examples, the graphics rendering instructions may include software instructions that may conform to a graphics application programming interface (API). In order to process the graphics rendering instructions, processing unit 127 may issue one or more graphics rendering commands to GPU 120 (e.g., through graphics driver 115) to cause GPU 120 to perform some or all of the rendering of the graphics data. In some examples, the graphics data to be rendered may include a list of graphics primitives, e.g., points, lines, triangles, quadrilaterals, triangle strips, etc.

GPU 120 may be configured to perform graphics operations to render one or more graphics primitives to a display. Accordingly, when one of the software applications executing on processing unit 127 requires graphics processing, processing unit 127 may provide graphics commands and graphics data to GPU 120 for rendering to the display. The graphics data may include, e.g., drawing commands, state information, primitive information, texture information, etc. GPU 120 may, in some instances, be built with a highly parallel structure that provides more efficient processing of complex graphic-related operations than processing unit 127. For example, GPU 120 may include a plurality of processing elements that are configured to operate on multiple vertices or pixels in a parallel manner.

GPU 120 may be directly coupled to GMEM 121. In other words, GPU 120 may process data locally using a local storage, instead of off-chip memory. This allows GPU 120 to operate in a more efficient manner by eliminating the need of GPU 120 to read and write data via, e.g., a shared bus, which may experience heavy bus traffic. GMEM 121 may include one or more volatile or non-volatile memories or storage devices, such as, e.g., random access memory (RAM), static RAM (SRAM), dynamic RAM (DRAM), and one or more registers.

The GMEM 121 may also be directly coupled to at least a pixel processor 123 and a geometry processor 125. In some cases, the GPU 120 may utilize the geometry processor 125 to process polygons and perform transforms, such as translation, scaling, rotation, field-of-view, and depth test near and far field clipping, among others, for an image to be made, and the geometry processor 125 to associate data to pixels for the image to be made. The geometry processor 125 may be configured to upscaling the first image to a second image at a second resolution higher than the first resolution, where the second image includes a plurality of second pixels including an interpolated pixel from the plurality of first pixels, where the interpolated pixel has an intensity value derived from a plurality of neighboring pixels to the interpolated pixel in the plurality of first pixels, the intensity value being based at least in part on, for a respective pixel of the neighboring pixels, an intensity difference between an intensity value of the respective pixel and an average intensity value of a subset of the neighboring pixels surrounding the interpolated pixel, and a spatial difference between the respective pixel and the interpolated pixel. In some aspects, the processors that perform the above-described functions may be a general processors (e.g., CPU).

The pixel processor 123 may be a CPU, a GPU, a general-purpose GPU (GPGPU), or any other processing unit that may be configured to perform graphics processing. In some examples, the pixel processor 123 may be integrated into a motherboard of the device 104. In some examples, the pixel processor 123 may be present on a graphics card that is installed in a port in a motherboard of the device 104 or may be otherwise incorporated within a peripheral device configured to interoperate with the device 104. The pixel processor 123 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the pixel processor 123 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The geometry processor 125 may be a CPU, a GPU, a GPGPU, or any other processing unit that may be configured to perform graphics processing. In some examples, geometry processor 125 may be integrated into a motherboard of the device 104. In some examples, the geometry processor 125 may be present on a graphics card that is installed in a port in a motherboard of the device 104 or may be otherwise incorporated within a peripheral device configured to interoperate with the device 104. The geometry processor 125 may include one or more processors, such as one or more microprocessors, GPUs, ASICs, FPGAs, ALUs, DSPs, discrete logic, software, hardware, firmware, other equivalent integrated or discrete logic circuitry, or any combinations thereof. If the techniques are implemented partially in software, the geometry processor 125 may store instructions for the software in a suitable, non-transitory computer-readable storage medium, e.g., internal memory 129, and may execute the instructions in hardware using one or more processors to perform the techniques of this disclosure. Any of the foregoing, including hardware, software, a combination of hardware and software, etc., may be considered to be one or more processors.

Processing unit 127 and/or GPU 120 may store rendered image data in a frame buffer 128, which may be an independent memory or may be is allocated within system memory 124. A display processor may retrieve the rendered image data from frame buffer 128 and display the rendered image data on a display.

System memory 124 may be a memory in the device and may reside external to processing unit 127 and GPU 120, i.e., off-chip with respect to processing unit 127, and off-chip with respect to GPU 120. System memory 124 may store applications that are executed by processing unit 127 and GPU 120. Furthermore, system memory 124 may store data upon which the executed applications operate, as well as the data that result from the application.

System memory 124 may store program modules, instructions, or both that are accessible for execution by processing unit 127, data for use by the programs executing on processing unit 127, or two or more of these. For example, system memory 124 may store a window manager application that is used by processing unit 127 to present a graphical user interface (GUI) on a display. In addition, system memory 124 may store user applications and application surface data associated with the applications. As explained in detail below, system memory 124 may act as a device memory for GPU 120 and may store data to be operated on by GPU 120 as well as data resulting from operations performed by GPU 120. For example, system memory 124 may store any combination of texture buffers, depth buffers, stencil buffers, vertex buffers, frame buffers, or the like.

Examples of system memory 124 include, but are not limited to, a random-access memory (RAM), a read only memory (ROM), or an electrically erasable programmable read-only memory (EEPROM), or any other medium that can be used to carry or store desired program code in the form of instructions or data structures and that can be accessed by a computer or a processor. As one example, system memory 124 may be removed from the device, and moved to another device. As another example, a storage device, substantially similar to system memory 124, may be inserted into the device.

Figure 1B:
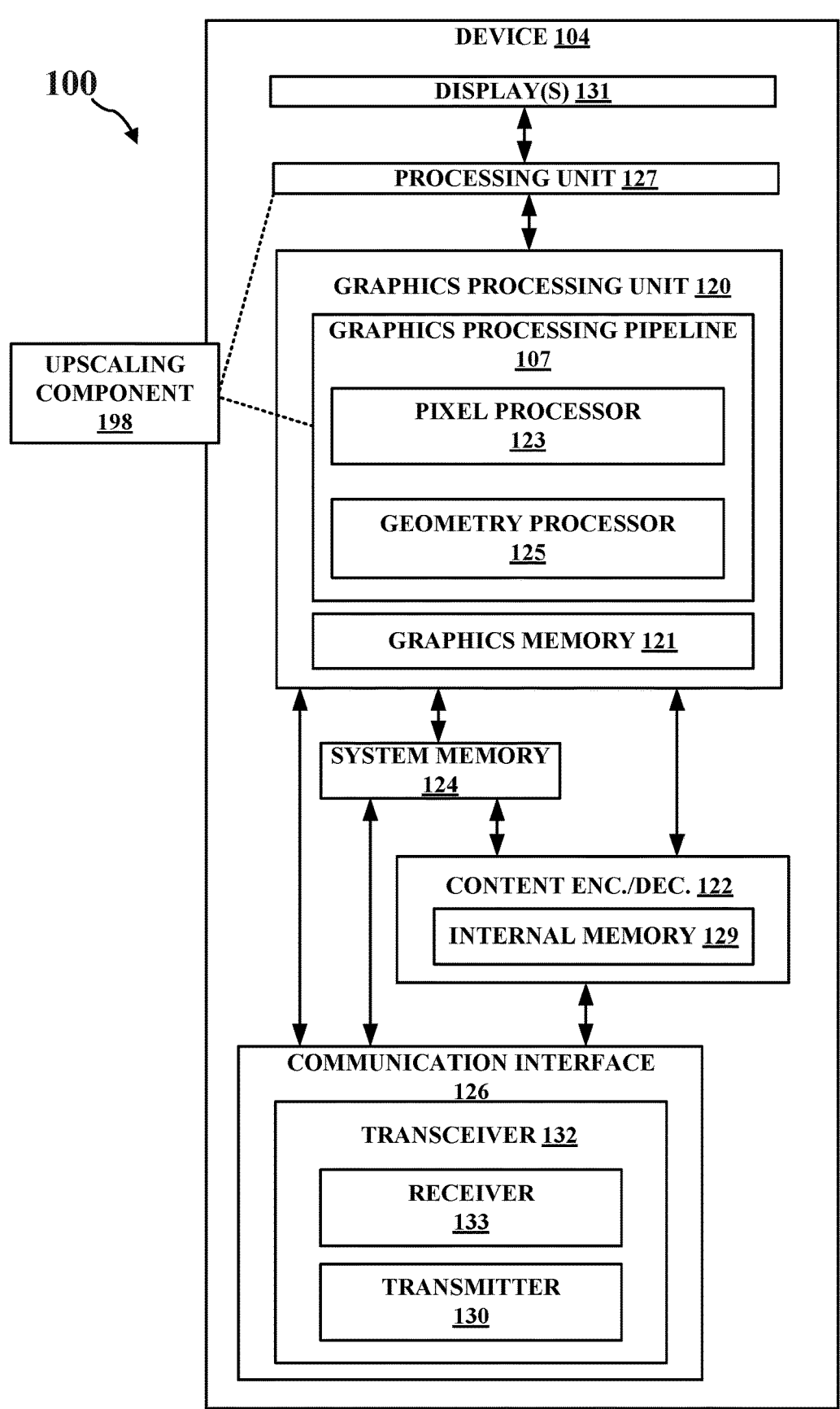
FIG. 1B is a block diagram that illustrates an example of a content upscaling system in accordance with one or more techniques of this disclosure.

FIG. 1B is a more detailed block diagram that illustrates an image upscaling system 100 configured to implement one or more techniques of this disclosure. It is noted that the image upscaling system 100 shown in FIG. 1B corresponds to that of FIG. 1A. In this regard, the image upscaling system 100 of FIG. 1B includes a processing unit 127, a GPU 120 and a system memory 124.

As further shown, the image upscaling system 100 includes a device 104 that may include one or more components configured to perform one or more techniques of this disclosure. In the example shown, the device 104 may include a GPU 120, a content encoder/decoder 122, and system memory 124. In some aspects, the device 104 can include a number of additional and/or optional components, e.g., a communication interface 126, a transceiver 132, a receiver 133, and a transmitter 130, and one or more displays 131. Reference to the display 131 may refer to the one or more displays 131. For example, the display 131 may include a single display or multiple displays. The display 131 may include a first display and a second display. In further examples, the results of the graphics processing may not be displayed on the device, e.g., the displays 131 may not receive any frames for presentment thereon. Instead, the frames or graphics processing results may be transferred to another device. In some aspects, this can be referred to as hybrid-rendering.

The GPU 120 includes graphics memory (GMEM) 121. The GPU 120 may be configured to perform graphics processing, such as in a graphics processing pipeline 107. The content encoder/decoder 122 may include an internal memory 129. In some examples, the device 104 may include a display processor, such as the processing unit 127, to perform one or more display processing techniques on one or more frames generated by the GPU 120 before presentment by the one or more displays 131 as described above. The processing unit 127 may be configured to perform display processing. The one or more displays 131 may be configured to display or otherwise present frames processed by the processing unit 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the GPU 120 and the content encoder/decoder 122, such as system memory 124 as described above, may be accessible to the GPU 120 and the content encoder/decoder 122. For example, the GPU 120 and the content encoder/decoder 122 may be configured to read from and/or write to external memory, such as the system memory 124. The GPU 120 and the content encoder/decoder 122 may be communicatively coupled to the system memory 124 over a bus. In some examples, the GPU 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The GMEM 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that GMEM 121 or the system memory 124 is non-movable or that its contents are static. As one example, the system memory 124 may be removed from the device 104 and moved to another device. As another example, the system memory 124 may not be removable from the device 104.

The GPU may be configured to perform graphics processing according to the techniques as described herein. In some examples, the GPU 120 may be integrated into a motherboard of the device 104. In some examples, the GPU 120 may be present on a graphics card that is installed in a port in a motherboard of the device 104, or may be otherwise incorporated within a peripheral device configured to interoperate with the device 104. The GPU 120 may include one or more processors, such as one or more microprocessors, GPUs, ASICS, FPGAS, ALUs, DSPs, discrete logic, software, hardware, firmware, other equivalent integrated or discrete logic circuitry, or any combinations thereof. If the techniques are implemented partially in software, the GPU 120 may store instructions for the software in a suitable, non-transitory computer-readable storage medium and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content encoding/decoding. In some examples, the content encoder/decoder 122 may be integrated into a motherboard of the device 104. The content encoder/decoder 122 may include one or more processors, such as one or more microprocessors, ASICs, FPGAs, ALUs, DSPs, video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 129, and may execute the instructions in hardware using one or more processors to perform the techniques of this disclosure. Any of the foregoing, including hardware, software, a combination of hardware and software, etc., may be considered to be one or more processors.

In some aspects, the image upscaling system 100 can include an optional communication interface 126. The communication interface 126 may include a receiver 133 and a transmitter 130. The receiver 133 may be configured to perform any receiving function described herein with respect to the device 104. Additionally, the receiver 133 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 133 and the transmitter 130 may be combined into a transceiver 132. In such examples, the transceiver 132 may be configured to perform any receiving function and/or transmitting function described herein with respect to the device 104.

Referring again to FIG. 1A, in certain aspects, the graphics processing unit 120 or the processing unit 127 may include an upscaling component 198 that is configured to control the processor (comprising a CPU or GPU) or general-purpose processor to perform graphics processing. Moreover, the upscaling component 198 can be configured to upscale the first image to a second image at a second resolution higher than the first resolution, where the second image includes a plurality of second pixels including an interpolated pixel from the plurality of first pixels, where the interpolated pixel has an intensity value derived from a plurality of neighboring pixels to the interpolated pixel in the plurality of first pixels, where the intensity value is based at least in part on, for a respective pixel of the neighboring pixels, an intensity difference between an intensity value of the respective pixel and an average intensity value of a subset of the neighboring pixels surrounding the interpolated pixel, and a spatial difference between the respective pixel and the interpolated pixel.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component, e.g., a GPU, but, in further embodiments, can be performed using other components, e.g., a CPU, consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
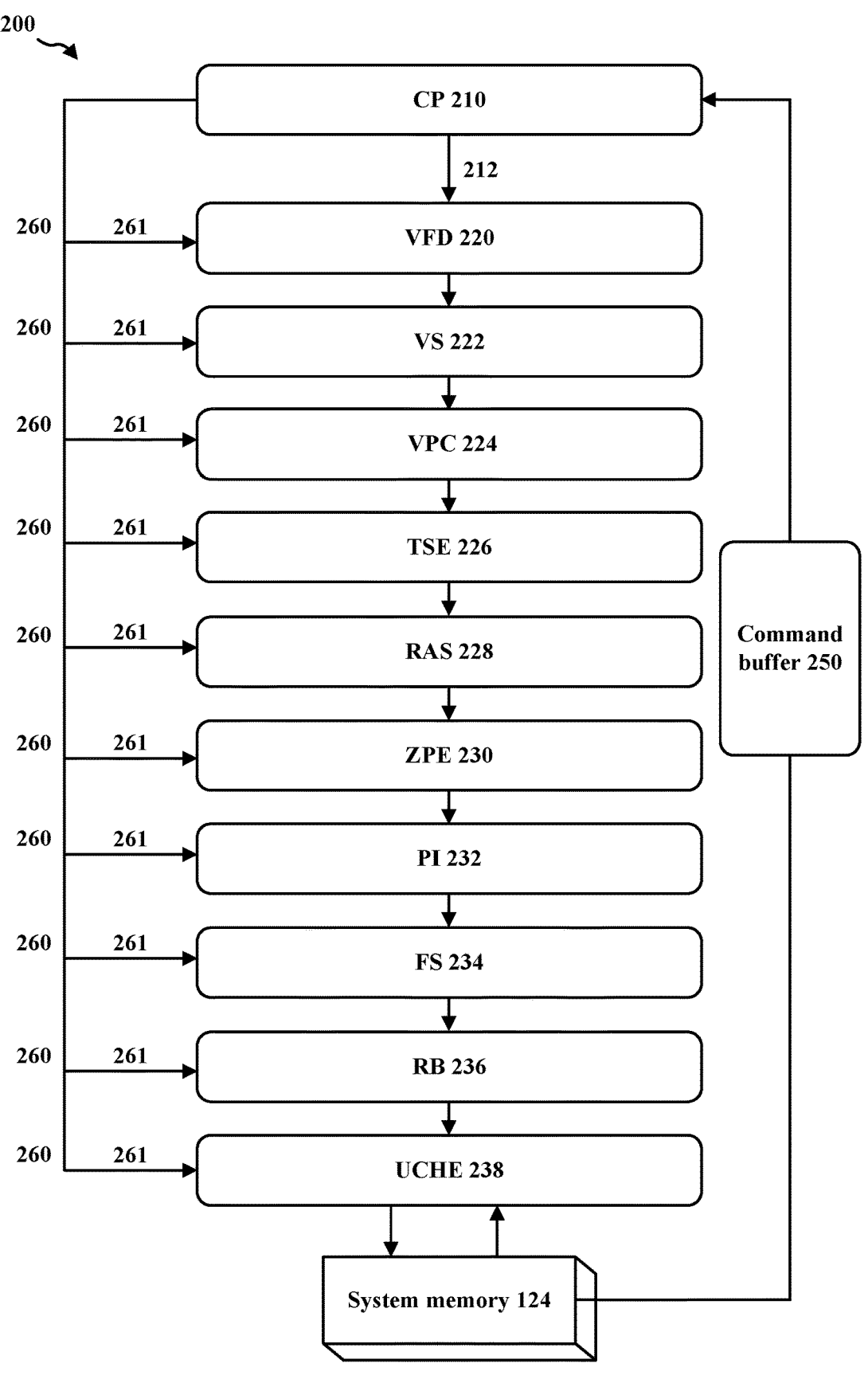
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 124. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

GPUs herein can process multiple types of data in a GPU pipeline. For instance, in some aspects, a GPU can process two types of data or data packets, e.g., context register packets and draw cell data.

As shown in FIG. 2, a GPU can utilize a CP, e.g., CP 210, or hardware accelerator to parse a command buffer into context register packets, e.g., context register packets 260, and/or draw call data packets, e.g., draw call packets 212.

The CP 210 can then send the context register packets 260 or draw call packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

Figure 3:
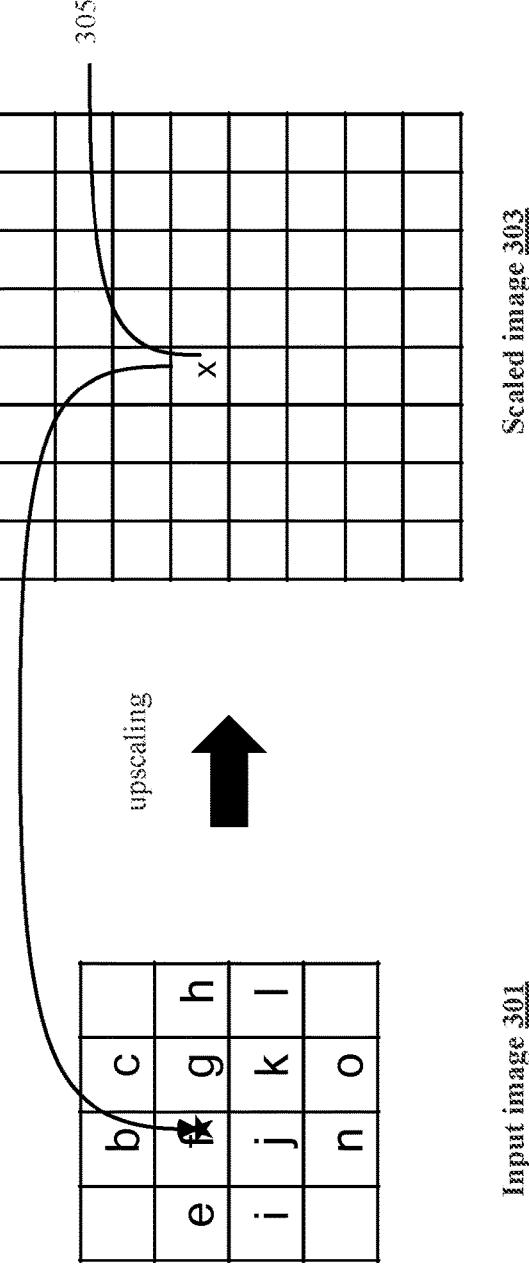
FIG. 3 illustrates a diagram illustrating an example of an upscaling approach.

FIG. 3 is a conceptual diagram showing an upscaling approach. Specifically, FIG. 3 shows an example technique 300 for generating scaled images from an input image 301. As shown, the input image 301 contains a 4×4 grid of pixels (as an example) and will be upscaled to a scaled image 303 containing 8×8 (as another example) grid of pixels. Generally, image rendering is the process of generating an image based on an input image.

The input image 301 includes a 12-tap window for pixels (e.g., pixels b, c, e, f, g, h, i, j, k, l, n, o) with known intensity values surrounding a pixel 305 to be interpolated. The 12-tap window of pixels surrounding a computed location of the pixel 305 to be interpolated is used to derive the intensity of the pixel 305 to be interpolated in the scaled image 303. In total, 36 components (R, G, B channels per sample) may be sampled from the input image 301 for computing the intensity value of the interpolated pixel 305. While this example specifically refers to a 12-tap window of pixels with 36 components that may be sampled across red, green, and blue channels, the number of pixels or components may be different in other examples. For instance, the input image 301 may more generally include a n-tap window with m*n components, where n=12 and m=3 in the illustrated example but may be different in other examples.

Figure 4B:
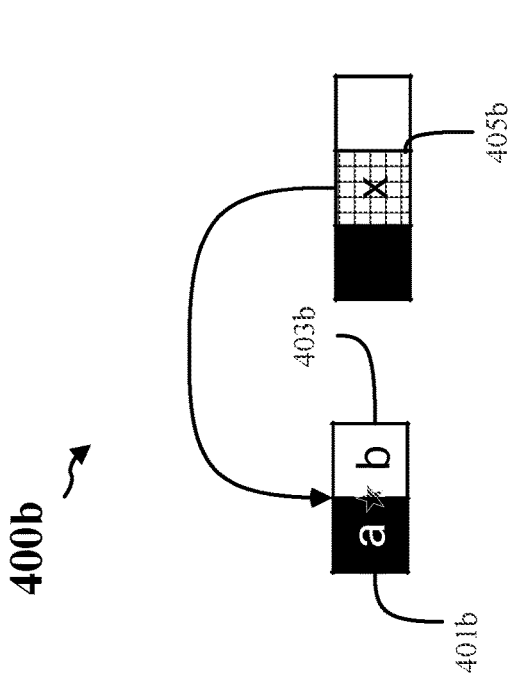
FIG. 4B illustrates a diagram illustrating an example of a range aware spatial upscaling (RASU) approach.
Figure 4B:
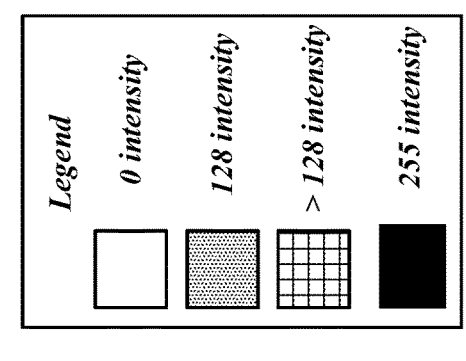
Figure 4A:
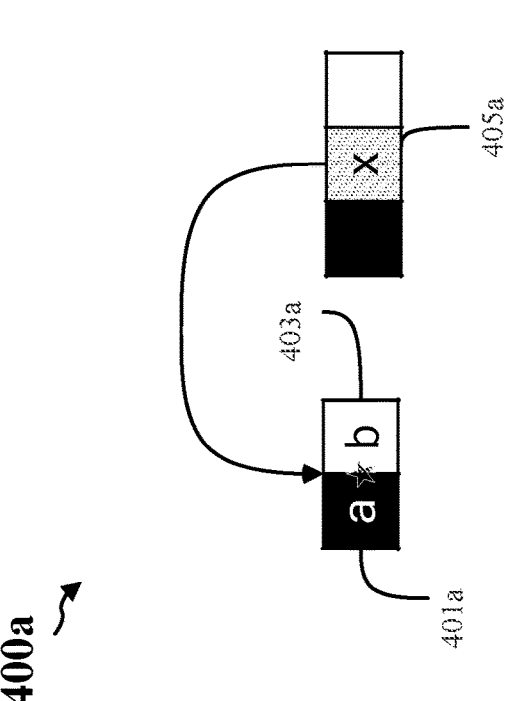
FIG. 4A illustrates a diagram illustrating an example of a bilinear upscaling approach.
Figure 4A:
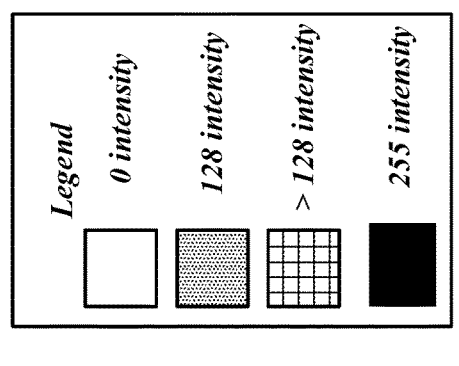

FIGS. 4A-4B illustrate examples 400a, 400b of two upscaling approaches for interpolating a pixel according to one or more techniques of this disclosure. One technique that computer games may use to compose a main pass image and the UI is to use a bilinear scale to upscale a lower resolution main pass by applying a linear interpolation and then combining it with the higher resolution UI. This technique is illustrated in FIG. 4A. At the beginning of a UI draw, the 3D scene is bilinearly upscaled to a 2D UI resolution. Bilinear scaling considers the closest two by two neighborhood of known pixel values surrounding a computed location of an unknown pixel and then takes a weighted average of those four pixels. This issue is fast, but edge preservation and finer details may be lost in the upscale and appear blurry at edge positions. As another option to bilinear scaling, computer game studios use AMD's FidelityFX Super Resolution (FSR) 1.0 algorithm for personal computing games because AMD FSR 1.0 provides an edge preserving algorithm that will render the image during upscaling. FSR 1.0 uses a simple spatial upscaling technology that renders game visuals at a lower resolution and then upscales the image to fit a monitor resolution. In contrast, edges and finer details of a rendered image may be preserved by taking into account both a spatial difference and intensity difference of neighboring pixels, rather than simply using a spatial difference to upscale a rendered image. This technique is illustrated in FIG. 4B.

FIG. 4A illustrates an example of calculating the intensity of an interpolated pixel 405a that is interpolated from pixels 401a and 403a using spatial difference computations. For instance, as shown in the example of FIG. 4A, the intensity value of the pixel 405a to be interpolated may be the weighted average of intensity values from pixels a 401a and pixel b 403b in a kernel window. This weight is based on a Lanczos filter, which is a Fourier method of filtering digital data. The Lanczos filter is an effective reconstruction filter for image upscaling because it can smoothly interpolate the value of a digital signal between its samples. It may map each sample of the given signal to a translated and scaled copy of the Lanczos kernel, which is a sinc function windowed by a central lobe of a second, longer, sinc function. The sum of these translated and scaled kernels may then be evaluated at the desired points.

For instance, pixel 405a located at position x may be interpolated in the output image, one of the neighboring pixels (e.g., 401a, 403a) in the kernel window is located at location $p_j$, and thus the intensity value I of pixel 405a reparented by pixel x may be given by the function:

$$I^{scaled}(x) = \frac{1}{W_p} \sum_{p \in \Omega} I(p_j)\text{Lanczos\_2}(\|p_j - x\|)$$

where x is the location of pixel 405a, $\Omega$ is the n pixels sample window (e.g., n=12 or a different number), $\|p_j - x\|$ is the Euclidian distance between these two pixels, and $W_p$ is a normalization term.

In the examples of FIGS. 4A-4B, pixel 401a and 401b, represented as pixel a, and pixel b 403a and 403b, represented as pixel b, both have a large difference in intensity (e.g., one is black with intensity value 0 and one is white with intensity value 255), but have a similar spatial difference with pixel 405a and 405b, represented as pixel x.

The intensity of the pixel 405a to be interpolated using a linear interpolation (LERP) technique such as bilinear scaling in FIG. 4A may be a weighted average of intensity from the known pixels in the kernel window. However, simply taking the weighted average of intensity from the known pixels may blur the sharp edge. For example, as shown in FIG. 4A, the intensity of interpolated pixel 405a may have an average weight of the intensity of pixel a 401a and pixel b 403b (e.g., with intensity value 128). Therefore, it would be helpful to provide an edge preserving property in the upscaling.

In one approach to achieve this edge preserving property, edge detection may be applied giving more weight for pixels which are along the edge. In another approach, a bilateral filter style may be applied to give more weight for pixels which have closer intensity values. A bilateral filter is a non-linear, edge preserving filter, and noise-reducing smoothing filter for images. Its weights depend not just on Euclidean distance of pixels, but also on color intensity. This helps preserve the sharp edges. The weight of a bilateral filter may be defined as:

$$W_i = g_s(\|x_i - x\|)f_r(\|I(x_i) - I(x)\|)$$

where the weight $W_i$ of each interpolated pixel x in a window including neighboring pixels $x_i$ is assigned using spatial closeness between these pixels (using a spatial kernel $g_s$) and intensity difference between these pixels (using a range kernel $f_r$). However, while a bilateral filter offers a quick method to preserve edges, it removes small details such as isolated bright pixels. It would therefore be helpful if during rendering image upscaling, both edge preserving and small detail preserving may be maintained.

To this end, a range aware spatial upscaling (RASU) technique is provided which maintains both the scalar properties of edge preserving and detail preserving utilizing a non-linear and non-AI super resolution process. For edge preserving, similar to bilateral filtering, RASU allows more weight to be assigned to pixels with a closer intensity value than in LERP. For detail preserving, RASU provides a fusion of the spatial distance and intensity difference between pixels which may prevent small details from being smoothed.

In RASU, a pixel 405$b$ to be interpolated is located at position x that may be interpolated in the output image and one of its neighboring pixels in kernel window is located at position $p_j$. It uses a range filter $f_r$ to estimate the intensity distance between two pixels $f_r(\|I(p_j)-I(x)\|)$ and fuses the intensity distance and the spatial distance by the function:

$$D_j = \alpha * \|p_j - x\| + \beta * \|p_j - x\| f_r(\|I(p_j) - \bar{I}(x)\|)$$

where $D_j$ is the weighted distance for the pixel, $\alpha$ and $\beta$ are pre-configured coefficients, $\|p_j-x\|$ is the spatial distance between the neighboring pixel and the interpolated pixel, and $f_r(\|I(p_j)-\bar{I}(x)\|)$ is the range filtered, intensity distance between the intensity value of the neighboring pixel and the mean intensity of the neighboring pixels or of a subset of the neighboring pixels.

RASU thus allows pixels with both closer spatial distance and intensity distance to be given more weight. Then RASU also utilizes a Lanczos kernel, such as a Lanczos-2 function, as reconstruction filter to derive the output pixel value, where the intensity value of the interpolated pixel in the scaled image is given by the function:

where $I(p_j)$ is the intensity value of the neighboring pixel at position j, Lanczos_2(Dj) is the Lanczos-2 function applied to $D_j$, $\Omega$ is the n pixels sample window (e.g., n=12 or a different number), and $W_p$ is the normalization term.

Thus, in the example of FIG. 4B, the intensity of an interpolated pixel may be calculated at least in part using a fusion of spatial difference ($\|p_j-x\|$) and intensity difference $\|I(p_j)-\bar{I}(x)\|$) between pixels. For instance, as shown in FIG. 4B, the intensity $I(p_j)$ of pixel 401$b$ represented by pixel a may be closer (smaller distance) to the average intensity $\bar{I}(x)$ of a specific window (e.g., the 12-tap kernel window in FIG. 3) than the intensity of pixel 403$b$ represented by pixel b. In such case, pixel 401$b$ may have a larger weight Dj to preserve the edge sharpness when rendering the intensity of interpolated pixel 405$b$ represented by pixel x ($I^{RASU\ scaled}(x)$) (e.g., resulting in an intensity value greater than 128).

In addition, a sharpening may be applied during the upscaling process in RASU. As an example, sharpening may include the following process. A slightly blurred version of the interpolated pixel is estimated, having intensity $\bar{I}(x)$. This estimation is then subtracted away from the RASU output (the intensity $I^{RASU\ scaled}(x)$ of interpolated pixel 405$b$) to detect the presence of edges, creating an un-sharp mask. Contrast is then increased along these edges using this mask. An example formula which may be applied for the sharpening or enhancement is as follows:

$$I^{RASU\ scaled}(x) = I^{RASU\ scaled}(x) + \gamma * (I^{RASU\ scaled}(x) - \bar{I}(x))$$

where $\gamma$ is a pre-configured coefficient and $I^{RASU\ scaled}(x)$ is the sharpened intensity value of the interpolated pixel at position x (following estimation, subtraction, and contrast increase).

Figure 5:
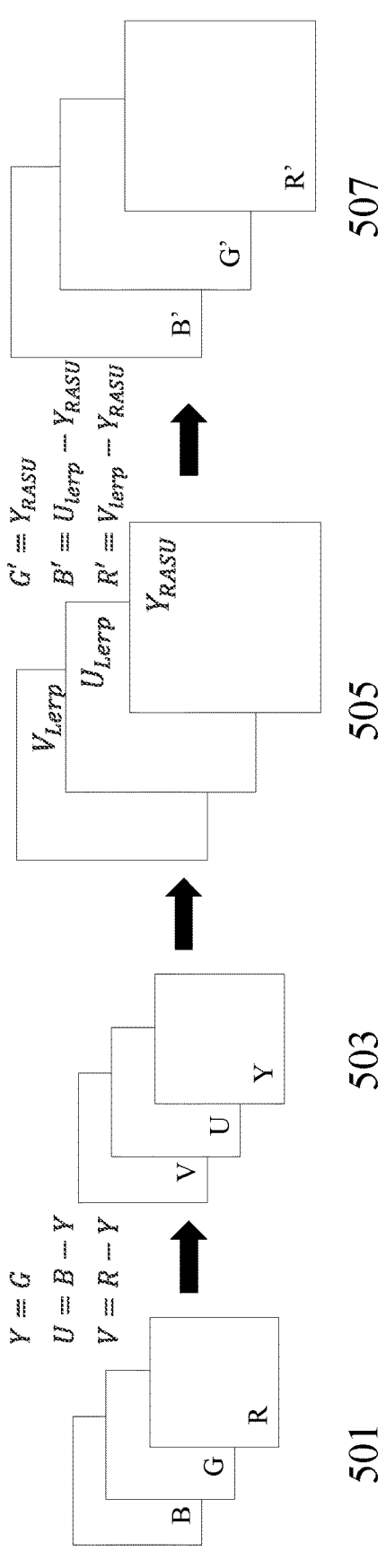
FIG. 5 illustrates an example process for a range aware spatial upscaling approach.

FIG. 5 illustrates an example process for a range aware spatial upscaling approach according to one or more techniques of this disclosure. Specifically, example 500 shows aspects of the disclosure upscaling an input image in the R, G, B color model by performing calculations in the YUV color model. The RGB color model is an additive color model in which the red, green, and blue primary colors of light are added together to reproduce different colors. YUV is a color model typically used as part of a color image pipeline. It can encode a color image by taking into account human perception which allows reduced bandwidth for chrominance components when compared to a RGB-representation.

In one example, RASU may be applied individually to R components, B components, and G components of pixels, but this may result in a significant number of computations. In another example, an input image may be converted from the RGB representation to a YUV color model, and since the human eye is most sensitive to the Y luminance component than the U and V chrominance components, RASU may be applied to the Y channel only. Instead, bilinear interpolation (or other function than RASU) may be applied to upscale the U and V channels. This technique may reduce the number of operations and texture sampling instructions applied when upscaling an image using RASU.

Accordingly, the G channel may be treated as Y channel directly to save resources when converting, while the U and V channels may be derived from the B and R channels respectively. Moreover, the upscaled G channel may correspond to the output of RASU applied to the Y channel, while the upscaled B and R channels may be derived from the differences between bilinear upscaled U and V channels and the RASU applied Y channel. These calculations may be represented by the following formulas:

$$Y=G$$

$$U=B-Y$$

$$V=R-Y$$

$$G'=Y_{RASU}$$

$$B'=U_{LERP}-Y_{RASU}$$

$$R'=V_{LERP}-Y_{RASU}$$

Thus, as shown in example 500, the input image 501 begins as R, G, B channels and is converted to an image 503 in YUV channels. Next, RASU is applied to the Y channel directly while LERP is applied to the U and V channel in order to save resources when converting to generate an upscaled image 505 in the YUV channel. The upscaled image 505 in the YUV channel is then converted back to an upscaled image 507 in the RGB channel.

Equivalently, the G channel output of an interpolated pixel x may be calculated using the following function, which combines the aforementioned functions for RASU:

$$I_g^{RASU\ scaled}(x) =$$

$$\frac{1}{W_p} \sum_{p \in \Omega} I_g(p_j) \text{Lanczos\_2}(\alpha * \|p_j - x\| + \beta * \|p_j - x\| f_r(\|I_g(p_j) - \bar{I_g}(x)\|))$$

Afterwards, this output $I_g^{RASU\ scaled}(x)$ may be clamped by a maximum or minimum intensity of the G channels of a subset of the neighboring pixels to the interpolated pixel (e.g., the center 2×2 pixels j, k, g, f of the neighboring pixels b, c, e, f, g, h, i, j, k, l, n, o illustrated in FIG. 3). Then, the R and B channels may be derived using bilinear interpolation from the G channel output respectively by the following functions:

$$I_r^{RASU\ scaled}(x) = I_r^{Bilinear\ scaled}(x) - I_g^{Bilinear\ scaled}(x) + I_g^{RASU\ scaled}(x)$$

$$I_b^{RASU\ scaled}(x) = I_b^{Bilinear\ scaled}(x) - I_g^{Bilinear\ scaled}(x) + I_g^{RASU\ scaled}(x)$$

FIG. 6 is a flowchart 600 of a method for graphic processing. The method may be performed by an apparatus, such as upscaling component 198, as described above. In some implementations, the method may be performed by processing logic, including hardware, firmware, software, or a combination thereof. In some implementations, the method may be performed by a processor executing code stored in a non-transitory computer-readable medium (e.g., a memory). The method allows an apparatus to upscale rendered images using a fusion of spatial distance and intensity distance that results in maintaining edge preserving and detail preserving.

At 602, the method may include receiving a first image including a plurality of first pixels at a first resolution. For example, 602 may be performed by the pixel processor 123. For instance, referring back to FIG. 3, the input image 301 may include a 12-pixel window of pixels (e.g., b, c, e, f, g, h, i, j, k, l, n, o) of known pixel intensity values. In another instance, referring back to FIG. 5, the input image 501 may be in the R, G, B channels.

At 604, the method may include upscaling the first image to a second image at a second resolution higher than the first resolution, the second image including a plurality of second pixels including an interpolated pixel from the plurality of first pixels, the interpolated pixel having an intensity value derived from a plurality of neighboring pixels to the interpolated pixel in the plurality of first pixels, the intensity value being based at least in part on, for a respective pixel of the neighboring pixels, an intensity difference between an intensity value of the respective pixel and an average intensity value of a subset of the neighboring pixels surrounding the interpolated pixel, and a spatial difference between the respective pixel and the interpolated pixel. In some aspects, the intensity distance may be determined based on a range filter. For example, 602 may be performed by the upscaling component 198. For instance, referring back to FIG. 4B, a RASU function upscales the image having an interpolated pixel 407b with an intensity value based on a weight according to an intensity distance between the interpolated pixel 407b and an average of pixel a 401b and pixel b 405b and the intensity value of pixel a 401b. In some aspects, the intensity value of the interpolated pixel may be derived from the intensity difference and the spatial difference using a Lanczos kernel.

In some aspects, the second function is bilinear interpolation. For instance, referring back to FIG. 5, a RASU function is applied to the Y channel of the upscaled image 505 in the YUV channel and a LERP function is applied to the U and V channel.

In some aspects, the neighboring pixels form a 12-pixel window surrounding the interpolated pixel. For instance, referring back to FIG. 3, the neighboring pixels (b, c, e, f, g, h, i, j, k, l, n, o) may form a 12-pixel window surrounding the interpolated pixel 305. In some aspects, the subset of the neighboring pixels form a window of two by two pixels adjacent to the interpolated pixel.

At 606, the method may include rendering the second image at the second resolution. For instance, referring back to FIG. 3, the scaled image 303 may be rendered based on the input image 301.

FIG. 7 is a flowchart 700 of a method of graphic processing. The method may be performed by an apparatus, such as upscaling component 198, as described above. In some implementations, the method may be performed by processing logic, including hardware, firmware, software, or a combination thereof. In some implementations, the method may be performed by a processor executing code stored in a non-transitory computer-readable medium (e.g., a memory). Optional aspects are illustrated in dashed lines. The method allows an apparatus to upscale rendered images using a fusion of spatial distance and intensity distance that results in maintaining edge preserving and detail preserving. In the flowchart 700, 602, 604, and 606 are performed as described above in connection with FIG. 6.

In addition, content aware optimization may be added. For the 12 pixels, if the pixel colors of pixel f, g, j and k are similar, bilinear interpolation may be used to derive the output pixel. This would also save on processing texture sampling instructions.

At 706, the method may include calculating a variance of intensity values for the subset of the neighboring pixels surrounding the interpolated pixel, wherein the intensity value of the interpolated pixel is derived from the intensity difference and the spatial difference in response to the variance being greater than or equal to a threshold. In some aspects, the intensity value may be derived for a green (G) channel output of the interpolated pixel. In some aspects, the intensity value for the G channel output of the interpolated pixel may be derived from the intensity difference and the spatial difference using a first function, and red (R) and blue (B) channel outputs of a different interpolated pixel are calculated using a second function different than the first function. For instance, referring back to FIG. 5, the upscaled image 505 in the YUV channel is upscaled by applying RASU to the Y channel and bilinear interpolation to the U and V channel.

In some aspects, the method may include calculating a variance of intensity values for the subset of neighboring pixels surrounding a different interpolated pixel, wherein the intensity value of the interpolated pixel may be derived from the intensity difference and the spatial difference using a first function, and wherein an intensity value of the different interpolated pixel may be derived using a second function different than the first function in response to the variance of intensity values being less than a threshold At 708, the method may include sharpening the intensity value of the interpolated pixel prior to the rendering.

The subject matter described herein can be implemented to realize one or more benefits or advantages. For instance, the techniques disclosed herein enable the GPU 120 preserve edge sharpness and enhance details when upscaling a rendered image to a higher resolution. In addition, the techniques are content aware such that the GPU 120 may selectively utilize spatial distance and intensity distance when pixels to be interpolated are potential edge pixels. As a result, less textural sampling instructions are performed by the on-chip GMEM for rendering, which, in turn, leads to less operations that will reduce the overall processing consumption. As a result the apparatus and method further reduce the power consumption and computational requirements of the GPU 120 since it is storing less data into the on-chip graphics memory. This result in turn improves the overall performance of the GPU since the latency of waiting for ready data is also reduce. Thus, the processing techniques herein can improve or speed up data processing or execution and also improve resource or data utilization and/or resource efficiency.

The subject matter described herein can be implemented to realize one or more benefits or advantages. For instance, the described graphics processing techniques can be used by a server, a client, a GPU, a CPU, or some other processor that can perform computer or graphics processing to implement the split rendering techniques described herein. This can also be accomplished at a low cost compared to other computer or graphics processing techniques. Moreover, the computer or graphics processing techniques herein can improve or speed up data processing or execution. Further, the computer or graphics processing techniques herein can improve resource or data utilization and/or resource efficiency.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware.

Various examples have been described. These and other examples are within the scope of the following claims.

SOME ADDITIONAL EXAMPLES

The aspects described herein additionally include one or more of the following implementation examples described in the following numbered clauses.

Example 1 may be a method for graphics processing, comprising: receiving a first image including a plurality of first pixels at a first resolution; upscaling the first image to a second image at a second resolution higher than the first resolution, the second image including a plurality of second pixels including an interpolated pixel from the plurality of first pixels, the interpolated pixel having an intensity value derived from a plurality of neighboring pixels to the interpolated pixel in the plurality of first pixels, the intensity value being based at least in part on, for a respective pixel of the neighboring pixels, an intensity difference between an intensity value of the respective pixel and an average intensity value of a subset of the neighboring pixels surrounding the interpolated pixel, and a spatial difference between the respective pixel and the interpolated pixel; and rendering the second image at the second resolution.

Example 2 may be the method of Example 1, further comprising calculating a variance of intensity values for the subset of the neighboring pixels surrounding the interpolated pixel, wherein the intensity value of the interpolated pixel is derived from the intensity difference and the spatial difference in response to the variance being greater than or equal to a threshold.

Example 3 may be the method of Examples 1 or 2, wherein the intensity value is derived for a green (G) channel output of the interpolated pixel.

Example 4 may be any of the methods of Examples 1 to 3, wherein the intensity value for the G channel output of the interpolated pixel is derived from the intensity difference and the spatial difference using a first function, and red (R) and blue (B) channel outputs of a different interpolated pixel are calculated using a second function different than the first function.

Example 5 may be any of the methods of Examples 1 to 4, wherein the second function is bilinear interpolation.

Example 6 may be any of the methods of Examples 1 to 5, further comprising: calculating a variance of intensity values for the subset of neighboring pixels surrounding a different interpolated pixel, wherein the intensity value of the interpolated pixel is derived from the intensity difference and the spatial difference using a first function, and wherein an intensity value of the different interpolated pixel is derived using a second function different than the first function in response to the variance of intensity values being less than a threshold.

Example 7 may be any of the methods of Examples 1 to 6, wherein the intensity difference is determined based on a range filter.

Example 8 may be any of the methods of Examples 1 to 7, wherein the neighboring pixels form a 12-pixel window surrounding the interpolated pixel.

Example 9 may be any of the methods of Examples 1 to 8, wherein the subset of the neighboring pixels form a window of two by two pixels adjacent to the interpolated pixel.

Example 10 may be any of the methods of Examples 1 to 9, further comprising: sharpening the intensity value of the interpolated pixel prior to the rendering.

Example 11 may be any of the methods of Examples 1 to 10, wherein the intensity value of the interpolated pixel is derived from the intensity difference and the spatial difference using a Lanczos kernel.

Example 12 may be an apparatus for graphics processing, that is configured to: receive a first image including a plurality of first pixels at a first resolution; upscale the first image to a second image at a second resolution higher than the first resolution, the second image including a plurality of second pixels including an interpolated pixel from the plurality of first pixels, the interpolated pixel having an intensity value derived from a plurality of neighboring pixels to the interpolated pixel in the plurality of first pixels, the intensity value being based at least in part on, for a respective pixel of the neighboring pixels, an intensity difference between an intensity value of the respective pixel and an average intensity value of a subset of the neighboring pixels surrounding the interpolated pixel, and a spatial difference between the respective pixel and the interpolated pixel; and render the second image at the second resolution.

Example 13 may be the apparatus of Example 12, and being further configured to: calculate a variance of intensity values for the subset of the neighboring pixels surrounding the interpolated pixel, wherein the intensity value of the interpolated pixel is derived from the intensity difference and the spatial difference in response to the variance being greater than or equal to a threshold.

Example 14 may be the apparatus of Examples 12 or 13, wherein the intensity value is derived for a green (G) channel output of the interpolated pixel.

Example 15 may be the apparatus of any of the Examples 12 to 14, wherein the intensity value for the G channel output of the interpolated pixel is derived from the intensity difference and the spatial difference using a first function, and red (R) and blue (B) channel outputs of a different interpolated pixel are calculated using a second function different than the first function.

Example 16 may be the apparatus of any of the Examples 12 to 15, wherein the second function is bilinear interpolation.

Example 17 may be the apparatus of any of the Examples 12 to 16, and being further configured to calculate a variance of intensity values for a subset of neighboring pixels surrounding a different interpolated pixel, wherein the intensity value of the interpolated pixel is derived from the intensity difference and the spatial difference using a first function, and wherein an intensity value of the different interpolated pixel is derived using a second function different than the first function in response to the variance of intensity values being less than a threshold.

Example 18 may be the apparatus of any of the Examples 12 to 17, wherein the intensity difference is determined based on a range filter.

Example 19 may be the apparatus of any of the Examples 12 to 18, wherein the neighboring pixels form a 12-pixel window surrounding the interpolated pixel.

Example 20 may be the apparatus of any of the Examples 12 to 19, wherein the subset of the neighboring pixels form a window of two by two pixels adjacent to the interpolated pixel.

Example 21 may be the apparatus of any of the Examples 12 to 20, and being further configured to sharpen the intensity value of the interpolated pixel prior to the rendering.

Example 22 may be the apparatus of any of the Examples 12 to 21, wherein the intensity value of the interpolated pixel is derived from the intensity difference and the spatial difference using a Lanczos kernel.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware.

What is claimed is:

1. A method for graphics processing, comprising:

receiving a first image including a plurality of first pixels at a first resolution;

upscaling the first image to a second image at a second resolution higher than the first resolution, the second image including a plurality of second pixels including a first interpolated pixel and a second interpolated pixel that are derived from the plurality of first pixels, the upscaling comprising:

deriving an intensity value of the first interpolated pixel from a first plurality of neighboring pixels of a location of the first interpolated pixel corresponding to the plurality of first pixels, the intensity value being derived using a first function based at least in part on, for a respective pixel of the first plurality of neighboring pixels, an intensity difference between an intensity value of the respective pixel and an average intensity value of a subset of the first plurality of neighboring pixels, and a spatial difference between the respective pixel and the first interpolated pixel;

calculating a variance of intensity values for a second plurality of neighboring pixels of a location of the second interpolated pixel corresponding to the plurality of first pixels; and deriving an intensity value of the second interpolated pixel using a second function different than the first function in response to the variance of intensity values being less than a threshold; and rendering the second image at the second resolution.

2. The method of claim 1, the upscaling further comprising:

calculating a variance of intensity values for the subset of the first plurality of neighboring pixels, wherein the intensity value of the first interpolated pixel is derived from the intensity difference and the spatial difference in response to the variance of intensity values for the subset of the first plurality of neighboring pixels being greater than or equal to a threshold.

3. The method of claim 2, wherein the intensity value of the first interpolated pixel is derived for a green (G) channel output of the first interpolated pixel.

4. The method of claim 3, wherein the intensity value for the G channel output of the first interpolated pixel is derived from the intensity difference and the spatial difference using the first function, and red (R) and blue (B) channel outputs of the second interpolated pixel are calculated using the second function different than the first function.

5. The method of claim 1, wherein the second function is bilinear interpolation.

6. The method of claim 1, wherein the intensity difference is determined based on a range filter.

7. The method of claim 1, wherein the first plurality of neighboring pixels form a 12-pixel window surrounding the location of the first interpolated pixel corresponding to the plurality of first pixels.

8. The method of claim 1, wherein the subset of the first plurality of neighboring pixels form a window of two by two pixels adjacent to the location of the first interpolated pixel corresponding to the plurality of first pixels.

9. The method of claim 1, further comprising:

sharpening the intensity value of the first interpolated pixel prior to the rendering.

10. The method of claim 1, wherein the intensity value of the first interpolated pixel is derived from the intensity difference and the spatial difference using a Lanczos kernel.

11. An apparatus for graphics processing, comprising:

a processor, memory coupled with the processor; and instructions stored in the memory and operable, when executed by the processor, to cause the apparatus to:

receive a first image including a plurality of first pixels at a first resolution;

upscale the first image to a second image at a second resolution higher than the first resolution, the second image including a plurality of second pixels including a first interpolated pixel and a second interpolated pixel that are derived from the plurality of first pixels, wherein to upscale the first image, the instructions, when executed by the processor, further cause the apparatus to:

derive an intensity value of the first interpolated pixel from a first plurality of neighboring pixels of a location of the first interpolated pixel corresponding to the plurality of first pixels, the intensity value being derived using a first function based at least in part on, for a respective pixel of the first plurality of neighboring pixels, an intensity difference between an intensity value of the respective pixel and an average intensity value of a subset of the first plurality of neighboring pixels, and a spatial difference between the respective pixel and the first interpolated pixel;

calculate a variance of intensity values for a second plurality of neighboring pixels of a location of the second interpolated pixel corresponding to the plurality of first pixels; and derive an intensity value of the second interpolated pixel using a second function different than the first function in response to the variance of intensity values being less than a threshold; and render the second image at the second resolution.

12. The apparatus of claim 11, wherein, to upscale, the instructions, when executed by the processor, further cause the apparatus to:

calculate a variance of intensity values for the subset of the first plurality of neighboring pixels, wherein the intensity value of the first interpolated pixel is derived from the intensity difference and the spatial difference in response to the variance of intensity values for the subset of the first plurality of neighboring pixels being greater than or equal to a threshold.

13. The apparatus of claim 12, wherein the intensity value of the first interpolated pixel is derived for a green (G) channel output of the first interpolated pixel.

14. The apparatus of claim 13, wherein the intensity value for the G channel output of the first interpolated pixel is derived from the intensity difference and the spatial difference using the first function, and red (R) and blue (B) channel outputs of the second interpolated pixel are calculated using the second function different than the first function.

15. The apparatus of claim 11, wherein the second function is bilinear interpolation.

16. The apparatus of claim 11, wherein the intensity difference is determined based on a range filter.

17. The apparatus of claim 11, wherein first plurality of the neighboring pixels form a 12-pixel window surrounding the location of the first interpolated pixel corresponding to the plurality of first pixels.

18. The apparatus of claim 11, wherein the subset of the first plurality of neighboring pixels form a window of two by two pixels adjacent to the location of the first interpolated pixel corresponding to the plurality of first pixels.

19. The apparatus of claim 11, wherein the instructions, when executed by the processor, further cause the apparatus to:

sharpen the intensity value of the first interpolated pixel prior to the render.

20. The apparatus of claim 11, wherein the intensity value of the first interpolated pixel is derived from the intensity difference and the spatial difference using a Lanczos kernel.

21. An apparatus for graphics processing, comprising:

means for receiving a first image including a plurality of first pixels at a first resolution;

means for upscaling the first image to a second image at a second resolution higher than the first resolution, the second image including a plurality of second pixels including an interpolated pixel that is derived from the plurality of first pixels, the means for upscaling comprising:

means for deriving an intensity value of the interpolated pixel from a plurality of neighboring pixels of a location of the interpolated pixel corresponding to the plurality of first pixels, the intensity value being based at least in part on, for a respective pixel of the plurality of neighboring pixels, an intensity difference between an intensity value of the respective pixel and an average intensity value of a subset of the plurality of neighboring pixels, and a spatial difference between the respective pixel and the interpolated pixel; and means for rendering the second image at the second resolution.

22. The apparatus of claim 21, the means for upscaling further comprising:

means for calculating a variance of intensity values for the subset of the plurality of neighboring pixels, wherein the intensity value of the interpolated pixel is derived from the intensity difference and the spatial difference in response to the variance of intensity values for the subset of the plurality of neighboring pixels being greater than or equal to a threshold.

23. The apparatus of claim 22, wherein the intensity value of the interpolated pixel is derived for a green (G) channel output of the interpolated pixel.

24. The apparatus of claim 23, wherein the intensity value for the G channel output of the interpolated pixel is derived from the intensity difference and the spatial difference using a first function, and red (R) and blue (B) channel outputs of a different interpolated pixel are calculated using a second function different than the first function.

25. The apparatus of claim 24, wherein the second function is bilinear interpolation.

26. The apparatus of claim 21, the means for upscaling further comprising:

means for calculating a variance of intensity values for a second plurality of neighboring pixels of a location of a different interpolated pixel corresponding to the plurality of first pixels; and means for deriving an intensity value of the different interpolated pixel using a second function different than a first function in response to the variance of intensity values being less than a threshold, wherein the intensity value of the interpolated pixel is derived from the intensity difference and the spatial difference using the first function.

27. The apparatus of claim 21, wherein the plurality of neighboring pixels form a 12-pixel window surrounding the location of the interpolated pixel corresponding to the plurality of first pixels.

28. A non-transitory, computer-readable medium storing computer executable code, the code when executed by a processor cause the processor to:

receive a first image including a plurality of first pixels at a first resolution;

upscale the first image to a second image at a second resolution higher than the first resolution, the second image including a plurality of second pixels including a first interpolated pixel and a second interpolated pixel that are derived from the plurality of first pixels, wherein to upscale the first image, the code, when executed by the processor, further causes the processor to:

derive an intensity value of the first interpolated pixel from a first plurality of neighboring pixels of a location of the first interpolated pixel corresponding to the plurality of first pixels, the intensity value being derived using a first function based at least in part on, for a respective pixel of the first plurality of neighboring pixels, an intensity difference between an intensity value of the respective pixel and an average intensity value of a subset of the first plurality of neighboring pixels, and a spatial difference between the respective pixel and the first interpolated pixel;

calculate a variance of intensity values for a second plurality of neighboring pixels of a location of the second interpolated pixel corresponding to the plurality of first pixels; and derive an intensity value of the second interpolated pixel using a second function different than the first function in response to the variance of intensity values being less than a threshold; and render the second image at the second resolution.

29. The non-transitory, computer-readable medium of claim 28, wherein the intensity value of the first interpolated pixel is derived for a green (G) channel output of the first interpolated pixel.

30. The non-transitory, computer-readable medium of claim 29, wherein the intensity value for the G channel output of the first interpolated pixel is derived from the intensity difference and the spatial difference using the first function, and red (R) and blue (B) channel outputs of the second interpolated pixel are calculated using the second function different than the first function.

* * * * *